United States Patent
Kim et al.

(10) Patent No.: US 11,369,245 B2
(45) Date of Patent: *Jun. 28, 2022

(54) VACUUM CLEANER AND METHOD FOR CONTROLLING THE SAME

(71) Applicant: LG Electronics Inc., Seoul (KR)

(72) Inventors: Seongwoo Kim, Seoul (KR); Hansu Jung, Seoul (KR); Chungill Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 5 days.

This patent is subject to a terminal disclaimer.

(21) Appl. No.: 16/725,241

(22) Filed: Dec. 23, 2019

(65) Prior Publication Data

US 2020/0129026 A1    Apr. 30, 2020

Related U.S. Application Data

(63) Continuation of application No. 15/556,128, filed as application No. PCT/KR2016/002234 on Mar. 7, 2016, now Pat. No. 10,646,087.

(30) Foreign Application Priority Data

Mar. 6, 2015  (KR) ........................ 10-2015-0031571

(51) Int. Cl.
*G05D 1/02*     (2020.01)
*A47L 5/36*     (2006.01)
(Continued)

(52) U.S. Cl.
CPC ............. *A47L 9/2852* (2013.01); *A47L 5/362* (2013.01); *A47L 9/009* (2013.01); *A47L 9/2805* (2013.01);
(Continued)

(58) Field of Classification Search
CPC ..... A47L 2201/04; A47L 9/2852; A47L 5/362
See application file for complete search history.

(56) References Cited

U.S. PATENT DOCUMENTS 4,967,862 A    11/1990  Pong
6,481,515 B1   11/2002  Kirkoatrick
(Continued)

FOREIGN PATENT DOCUMENTS

EP    2420170    2/2012
JP    2571735    1/1997
(Continued)

OTHER PUBLICATIONS

European Search Report in European Appln. No. 16761951.9, dated Jan. 4, 2019, 9 pages.
(Continued)

*Primary Examiner* — Ryan Rink
(74) *Attorney, Agent, or Firm* — Fish & Richardson P.C.

(57) ABSTRACT

Provided is a vacuum cleaner. The vacuum cleaner includes a cleaner body including a moving device for moving, a suction device connected to the cleaner body to suction dusts and air and guide the suctioned dusts and air to the cleaner body, the suction device including a handle, a detection device for detecting a distance between the handle and the cleaner body, and a controller determining whether movement of cleaner body is necessary on the basis of the distance between the cleaner body and the handle, the controller controlling the moving device when the movement of the cleaner body is necessary. The controller controls the moving device to allow the cleaner body to avoid an obstacle when it is determined that an operation for avoiding the obstacle is necessary while the moving device operates.

12 Claims, 8 Drawing Sheets

(51) Int. Cl.
*A47L 9/28* (2006.01)
*A47L 9/00* (2006.01)
*B25J 13/08* (2006.01)

(52) U.S. Cl.
CPC ........... *A47L 9/2826* (2013.01); *A47L 9/2894* (2013.01); *B25J 13/08* (2013.01); *G05D 1/0255* (2013.01); *A47L 2201/04* (2013.01); *G05D 2201/0215* (2013.01)

(56) References Cited

U.S. PATENT DOCUMENTS

| | | |
|---|---|---|
| 2002/0174506 A1 | 11/2002 | Wallach |
| 2007/0157416 A1 | 7/2007 | Lee |
| 2009/0133720 A1 | 5/2009 | Van Den Bogert |
| 2010/0132149 A1 | 6/2010 | Jeong |
| 2015/0212520 A1 | 7/2015 | Artes |
| 2016/0008982 A1 | 1/2016 | Artes |
| 2016/0235268 A1 | 8/2016 | Choi |
| 2017/0354304 A1 | 12/2017 | Kwak |
| 2018/0000305 A1 | 1/2018 | Schultink |
| 2018/0008108 A1 | 1/2018 | Sauer |
| 2018/0008109 A1 | 1/2018 | Sauer |
| 2018/0177360 A1 | 6/2018 | Kwak |
| 2018/0213991 A1 | 8/2018 | Youk |
| 2019/0104908 A1* | 4/2019 | He .................. A47L 11/4066 |
| 2019/0387680 A1* | 12/2019 | Jagenstedt ............ A47L 9/2831 |
| 2021/0026367 A1* | 1/2021 | Yang ..................... A47L 9/2889 |
| 2021/0113048 A1* | 4/2021 | Jung .................. A47L 11/4011 |

FOREIGN PATENT DOCUMENTS

| | | |
|---|---|---|
| JP | 2006314569 | 11/2006 |
| KR | 1020080098736 | 11/2008 |
| KR | 1020090033782 | 4/2009 |
| KR | 20120017848 | 2/2012 |
| KR | 20120017849 | 2/2012 |
| KR | 1020120017846 | 2/2012 |
| KR | 1020120018248 | 3/2012 |

OTHER PUBLICATIONS

International Search Report in International Application No. PCT/KR2016/002234, dated Jun. 23, 2016, 2 pages (English translation).

* cited by examiner

VACUUM CLEANER AND METHOD FOR CONTROLLING THE SAME

CROSS-REFERENCE TO RELATED APPLICATIONS

This application is a continuation of U.S. application Ser. No. 15/556,128, filed on Sep. 6, 2017, which is National Stage application under 35 U.S.C. § 371 of International Application No. PCT/KR2016/002234, filed Mar. 7, 2016, which claims the benefit of Korean Application No. 10-2015-0031571, filed on Mar. 6, 2015. The disclosures of the prior applications are incorporated by reference in their entirety.

TECHNICAL FIELD

The present disclosure relates to a vacuum cleaner and a method for controlling the same.

BACKGROUND ART

In general, vacuum cleaners are devices that suction dusts or foreign substances scattered on a surface to be cleaned by using a suction motor mounted in a main body to filter the dusts or foreign substances in the main body.

Such a vacuum cleaner may be largely classified into an upright type vacuum cleaner in which a suction nozzle that is a suction hole is integrated with a main body and a canister type vacuum cleaner in which a suction nozzle communicates with a main body through a connection tube.

A vacuum cleaner is disclosed in Korean Patent Publication No. 2010-0053098 (Published Date: May 20, 2010) that is a prior document.

The vacuum cleaner includes a wheel for moving a cleaner body and a driving unit for driving the wheel. The vacuum cleaner detects rotation and translation motions of a movable member to control an operation of the driving unit.

In case of the vacuum cleaner as described above, since a structure in which the rotation and translation motions of the movable member are performed at the same time is provided, the structure may be complicated. Also, although the driving unit is moved by detecting a mechanical operation, actual movement of a user may not be accurately detected. Thus, it may be difficult to accurately move the cleaner body toward the user.

DISCLOSURE

Technical Problem

Embodiments provide a vacuum cleaner in which a cleaner body is capable of being accurately moved in a moving direction of a user and a method for controlling the same.

Embodiments also provide a vacuum cleaner in which a cleaner body is capable of avoiding an obstacle while being moved toward a user and a method for controlling the same.

Technical Solution

In one embodiment, a vacuum cleaner includes: a cleaner body including a moving device for moving; a suction device connected to the cleaner body to suction dusts and air and guide the suctioned dusts and air to the cleaner body, the suction device including a handle; a detection device for detecting a distance between the handle and the cleaner body; and a controller determining whether movement of cleaner body is necessary on the basis of the distance between the cleaner body and the handle, the controller controlling the moving device when the movement of the cleaner body is necessary, wherein the controller controls the moving device to allow the cleaner body to avoid an obstacle when it is determined that an operation for avoiding the obstacle is necessary while the moving device operates.

The moving device may include a plurality of wheels and a plurality of motors for rotating the plurality of wheels.

The vacuum cleaner may further include a plurality of current detectors for detecting current inputted into each of the plurality of motors, wherein the controller may determine whether the operation for avoiding the obstacle is necessary on the basis of the current detected by at least one current detector of the plurality of current detectors.

The controller may determine that the operation for avoiding the obstacle is necessary when the current detected by the at least one current detector of the plurality of current detectors is above limited current while the current is applied to the at least one motor of the plurality of motors.

The detection device may include: an ultrasonic transmitting unit disposed on the suction device to transmit ultrasonic waves; and an ultrasonic receiving unit disposed on the cleaner body to receive the ultrasonic waves transmitted from the ultrasonic transmitting unit, wherein the controller may determine whether the operation for avoiding the obstacle is necessary on the basis of an intensity of the ultrasonic waves received into the ultrasonic receiving unit and the current detected by the at least one current detector of the plurality of current detectors.

The controller may determine that the operation for avoiding the obstacle is necessary when a ratio of the current detected by the at least one current detector to the intensity of the ultrasonic waves is less than a reference ratio.

The vacuum cleaner may further include an obstacle detector disposed on the cleaner body to detect the obstacle, wherein, when the obstacle is detected by the obstacle detector while the cleaner body is moved, the controller may determine that the operation for avoiding the obstacle is necessary.

The controller may drive the moving device to allow the cleaner body to be moved backward so that the cleaner body avoids the obstacle.

The controller may control the moving device so that the cleaner body is rotated to a left or right side in a state in which the cleaner body is moved backward by a predetermined distance from the obstacle.

The controller may drive the moving device to allow the cleaner body to be rotated to a left or right side while the cleaner body is moved backward so that the cleaner body avoids the obstacle.

After the cleaner body avoids the obstacle, the controller may determine again whether the movement of the cleaner body is necessary on the basis of information detected by the detection device.

In another embodiment, a method for controlling a vacuum cleaner includes: detecting movement of a suction device by a detection device; determining whether movement of a cleaner body connected to the suction device is necessary by a controller on the basis of a distance between the suction device and the cleaner body; driving a moving device disposed on the cleaner body by the controller when the movement of the cleaner body is necessary; determining whether an operation for avoiding an obstacle is necessary by the controller while the moving device is driven; and controlling the moving device by the controller to allow the cleaner body to avoid the obstacle when the operation of the cleaner body for avoiding the obstacle is necessary.

The moving device may include a plurality of wheels and a plurality of motors for driving the plurality of wheels, wherein the controlling of the moving device to avoid the obstacle may include driving the plurality of motors at the same rotation rate so that the cleaner body is moved backward.

The moving device may include a plurality of wheels and a plurality of motors for driving the plurality of wheels, wherein the controlling of the moving device to avoid the obstacle may include driving the plurality of motors at rotation rates different from each other so that the cleaner body is rotated to a left or right side while being moved backward.

The method may further include: determining whether stopping of the cleaner body is necessary when the operation for avoiding the obstacle is unnecessary; and controlling the moving device to allow the cleaner body to be stopped when the stopping of the cleaner body is necessary.

The moving device may include a plurality of wheels and a plurality of motors for driving the plurality of wheels, wherein, in the determining of whether the operation of the cleaner body for avoiding the obstacle is necessary, whether the operation for avoiding the obstacle is necessary may be determined on the basis of current detected by at least one current detector of a plurality of current detectors for detecting current applied to each of the plurality of motors.

In the determining of whether the operation of the cleaner body for avoiding the obstacle is necessary, it may be determined that the operation for avoiding the obstacle is necessary when the current detected by the at least one current detector of the plurality of current detectors is above limited current.

Advantageous Effects

According to the proposed embodiment, since the cleaner body is moved to follow the movement of the user, the user may not directly move the cleaner body to improve the user's convenience.

Also, since whether the obstacle exists on the moving path of the cleaner body is determined to avoid the obstacle, the cleaner body may be accurately moved in the moving direction of the user.

Particularly, since whether the obstacle exists or whether an operation for avoiding the obstacle is necessary is determined while the cleaner body is moved, the reaction speed of the cleaner body may be quick when the movement of the cleaner body is necessary, and the vacuum cleaner may accurately avoid the obstacle.

DESCRIPTION OF DRAWINGS

FIGS. 4 to 6 are views illustrating states in which a cleaner body is moved to follow movement of a user, wherein

MODE FOR INVENTION

Exemplary embodiments of the present disclosure will be described below in more detail with reference to the accompanying drawings. It is noted that the same or similar components in the drawings are designated by the same reference numerals as far as possible even if they are shown in different drawings. In the following description of the present disclosure, a detailed description of known functions and configurations incorporated herein will be omitted to avoid making the subject matter of the present disclosure unclear.

In the description of the elements of the present disclosure, the terms 'first', 'second', 'A', 'B', '(a)', and '(b)' may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

Figure 1:
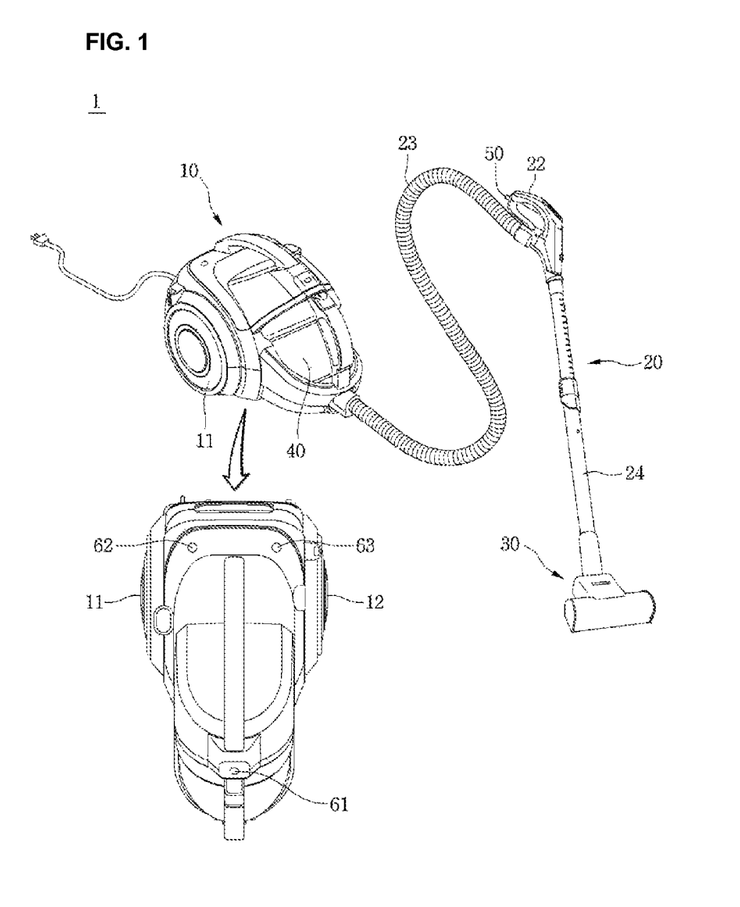
FIG. 1 is a perspective view of a vacuum cleaner according to an embodiment.
Figure 2:
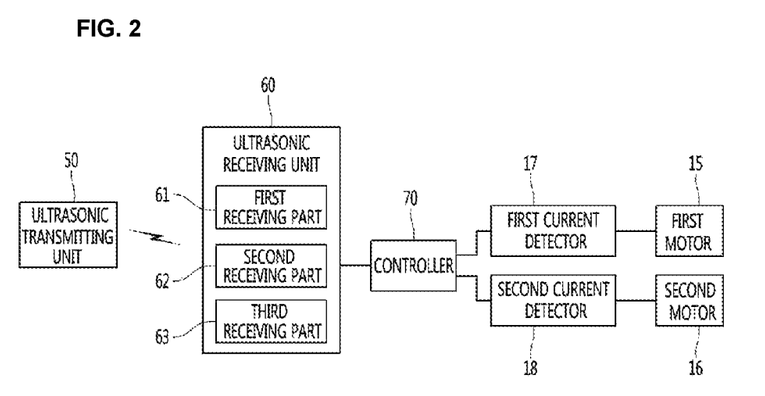
FIG. 2 is a block diagram of the vacuum cleaner according to an embodiment.

FIG. 1 is a perspective view of a vacuum cleaner according to an embodiment, and FIG. 2 is a block diagram of the vacuum cleaner according to an embodiment.

Referring to FIGS. 1 to 2, a vacuum cleaner 1 according to an embodiment may include a cleaner body 10 including a suction motor 14 for generating suction force and a suction device 20 connected to the cleaner body 10 to suction air and foreign substances on the bottom surface.

The cleaner body 10 may include a moving device for moving the cleaner body 10.

The moving device may include at least one wheel. For example, FIG. 1 illustrates a structure in which the moving device includes a plurality of wheels 11 and 12. The plurality of wheels 11 and 12 may be disposed on both sides of the cleaner body 10. The plurality of wheels 11 and 12 may include a first wheel 11 disposed on a right side of the cleaner body 10 and a second wheel 12 disposed on a left side of the cleaner body 10.

A dust container 40 in which dusts separated from air are stored may be separably connected to the cleaner body 10.

The suction device 20 may include a suction nozzle 30 that is movable along the bottom surface and a connection mechanism for connecting the suction nozzle 30 to the cleaner body 10.

The connection mechanism may include an extension tube 24 connected to the suction nozzle 30, a handle 22 connected to the extension tube 24, and a connection hose 23 connecting the handle 22 to the cleaner body 10.

The moving device may further include a motor for rotating the at least one wheel. When the moving device includes the plurality of wheels 11 and 12, the moving device may further include a plurality of motors 15 and 16 for respectively rotating the plurality of wheels 11 and 12. The plurality of motors 15 and 16 may include a first motor 15 and a second motor 16.

The first motor 15 may rotate the first wheel 11, and the second motor 16 may rotate the second wheel 12.

The motors 15 and 16 may be independently driven. When each of the motors 15 and 16 is driven, the cleaner body 10 may be automatically moved forward and backward and also rotated to a left or right side.

The vacuum cleaner 1 may further include an ultrasonic transmitting unit 50 for transmitting ultrasonic waves and an ultrasonic receiving unit 60 for receiving the ultrasonic waves transmitted from the ultrasonic transmitting unit 50.

The ultrasonic transmitting unit 50 may be disposed on the suction device 20. Although not shown, the ultrasonic transmitting unit 50 may be disposed on the handle 22 or the suction nozzle 30.

The ultrasonic receiving unit 60 may be disposed on the cleaner body 10. The ultrasonic receiving unit 60 may include a plurality of receiving parts 61, 62, and 63. The plurality of receiving parts 61, 62, and 63 may receive the ultrasonic waves transmitted from the ultrasonic transmitting unit 50.

When the plurality of receiving parts 61, 62, and 63 are horizontally or vertically projected, lines connecting the plurality of receiving parts 61, 62, and 63 to each other may have a triangular shape. For example, virtual lines connecting the plurality of first protrusions 62 to 63 to each other may have a triangular shape.

For example, the plurality of receiving parts 61, 62, and 63 may include a first receiving part 61, a second receiving part 62, and a third receiving part 63.

When the first to third receiving parts 61, 62, and 63 are horizontally or vertically projected, lines connecting the first to third receiving parts 61, 62, and 63 to each other may have a triangular shape.

A portion of the first to third receiving parts 61, 62, and 63 may be disposed at a height different from the other portion of the first to third receiving parts 61, 62, and 63. Also, two receiving parts of the first to third receiving parts 61, 62, and 63 may be disposed to be horizontally spaced apart from each other.

The vacuum cleaner 1 may further include a controller 70 for controlling the first motor 15 and the second motor 16.

The controller 70 may determine a position of the ultrasonic transmitting unit 50 on the basis of the ultrasonic waves received into the ultrasonic receiving unit 60. The controller 70 may drive at least one motor of the first motor 15 and the second motor 16 when the movement of the cleaner body 10 toward the ultrasonic transmitting unit 50 that is determined in position is necessary.

When the ultrasonic transmitting unit 50 is disposed on the handle 22, if the cleaning is performed while moving the handle 22, the ultrasonic transmitting unit 50 may be moved together with the handle 22. In this case, a distance between the ultrasonic transmitting unit 50 and the cleaner body 10 (or the ultrasonic receiving unit 60) may vary.

The handle 22 may be movable by a length of the connection hole 23. When the handle 22 is spaced a predetermined distance from the cleaner body 10, force for moving the handle 22 may be applied to the cleaner body 10 to move the cleaner body 10 forward.

Here, when each of the motors 15 and 16 is not driven, the force for moving the cleaner body 10 may be applied by the user. In this case, the user may take effect for moving the cleaner body 10. Thus, according to the current embodiment, when the distance between the ultrasonic transmitting unit 50 and the cleaner body 10 increases, the controller 70 may control the first motor 15 and the second motor 16 to move the cleaner body 10 toward the handle 22.

The vacuum cleaner 1 may further include a first current detector 17 for detecting current applied to the first motor 15 and a second current detector 18 for detecting current applied to the second motor 15.

The controller 70 may determine whether an obstacle exists around the cleaner body 10 on the basis of the current detected by each of the current detectors 17 and 18. If it is determined that the obstacle exists, the controller 70 may control at least one motor of the first motor 15 and the second motor 16 to allow the cleaner body 10 to avoid the obstacle.

Hereinafter, a method for controlling the vacuum cleaner will be described in detail.

Figure 3:
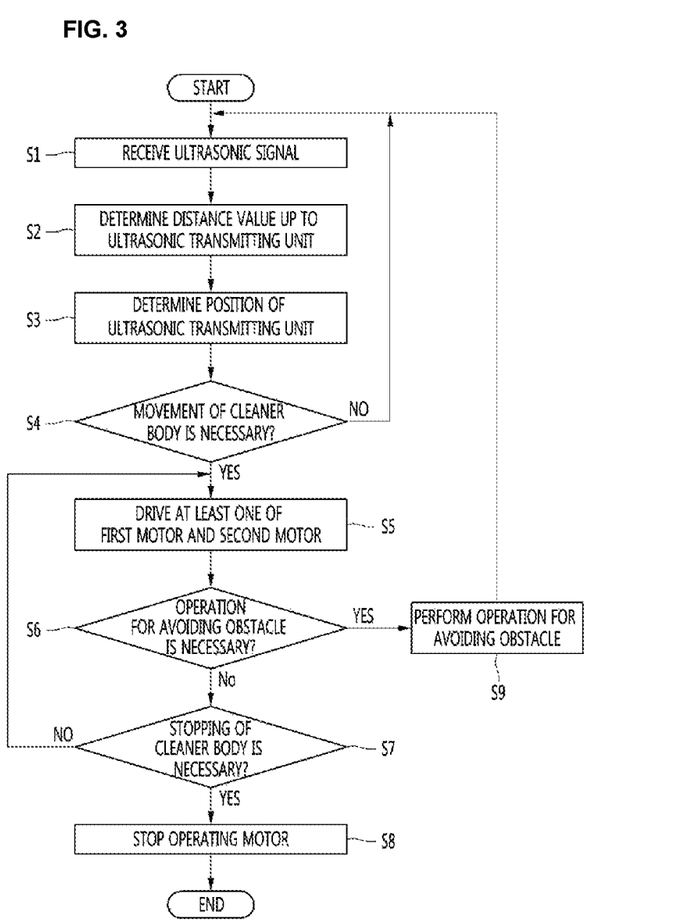
FIG. 3 is a flowchart for explaining a method for controlling the vacuum cleaner according to an embodiment.
Figure 4:
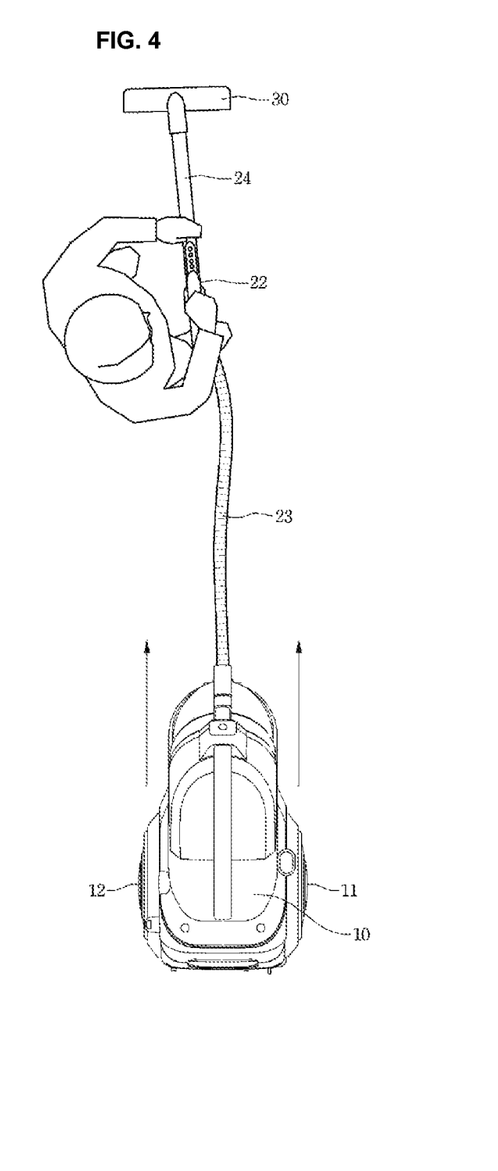
FIG. 4 is a view illustrating a state in which the cleaner body is moved forward.
Figure 5:
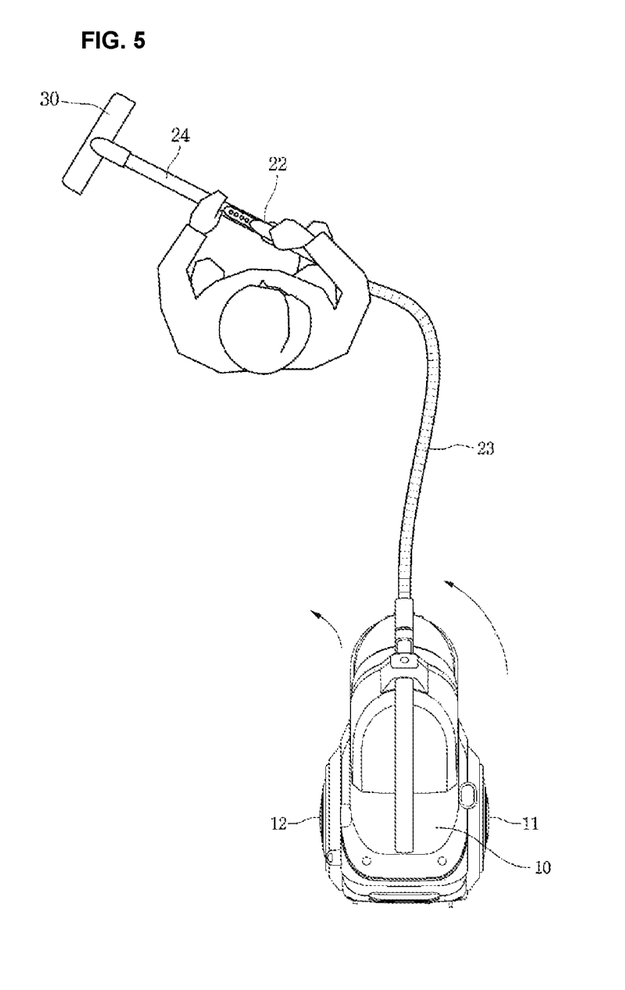
FIG. 5 is a view illustrating a state in which the cleaner body is rotated to a left side.
Figure 6:
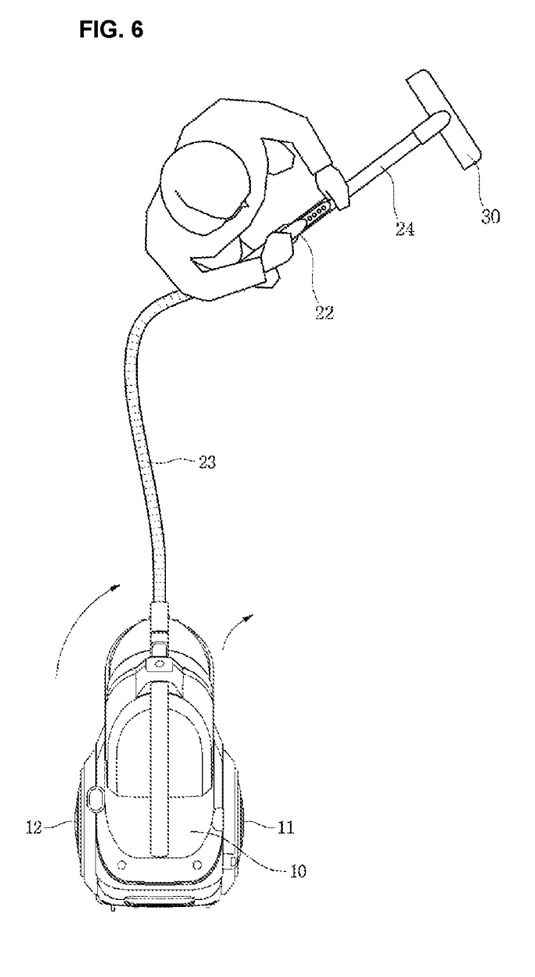
FIG. 6 is a view illustrating a state in which the cleaner body is rotated to a right side.
Figure 7:
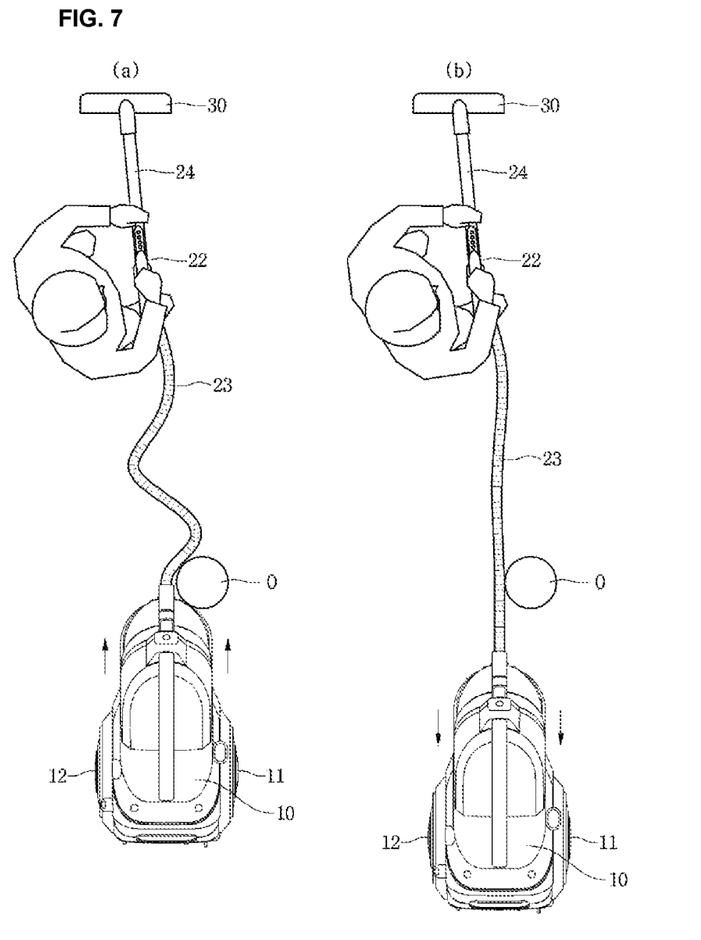
FIGS. 7 and 8 are views illustrating states in which the cleaner body avoids an obstacle.
Figure 8:
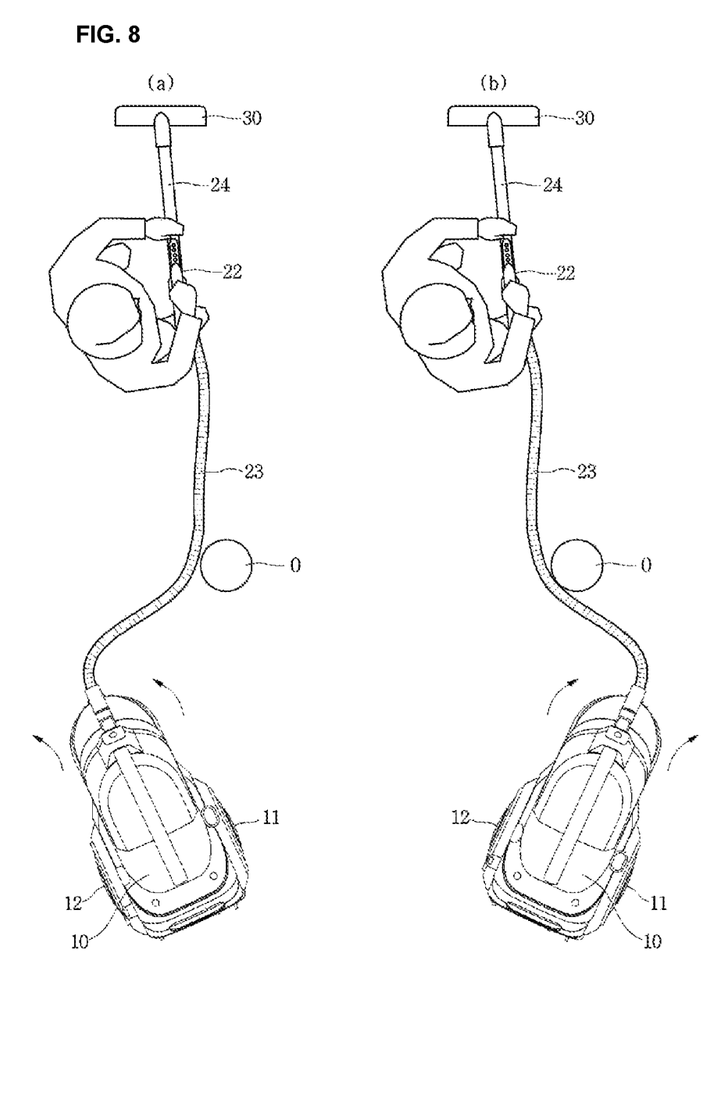

FIG. 3 is a flowchart for explaining a method for controlling the vacuum cleaner according to an embodiment, and FIGS. 4 to 6 are views illustrating states in which a cleaner body is moved to follow movement of the user. FIGS. 7 and 8 are views illustrating states in which the cleaner body avoids an obstacle.

FIG. 4 is a view illustrating a state in which the cleaner body is moved forward, FIG. 5 is a view illustrating a state in which the cleaner body is rotated to a left side, and FIG. 6 is a view illustrating a state in which the cleaner body is rotated to a right side.

Referring to FIGS. 2 to 8, while cleaning is performed by using the vacuum cleaner 1, the ultrasonic waves are transmitted from the ultrasonic transmitting unit 50.

Then, the ultrasonic receiving unit 60 may receive the ultrasonic waves transmitted from the ultrasonic transmitting unit 50 (S1).

The controller 70 determines a distance value between the ultrasonic transmitting unit 50 and each of the receiving parts 61, 62, and 63 on the basis of the ultrasonic waves received into each of the receiving parts 61, 62, and 63 (S2).

The controller 70 determines a position of the ultrasonic transmitting unit 50 by using the determined three distance values (S3).

Also, the controller 70 determines whether movement of the cleaner body 10 is necessary on the basis of the determined position of the ultrasonic transmitting unit 50 (S4).

In the current embodiment, when the movement of the cleaner body 10 is necessary, for example, the distance between the ultrasonic transmitting unit 50 and the cleaner body 10 may be above a first reference distance. Here, the reference distance may vary according to a length of the connection hose.

That is, when the first motor 15 and the second motor 16 are not driven, the cleaner body 10 may be maintained in a stopped state. In this state, since the handle 22 is moved while the cleaning is performed by using the suction device 20, the ultrasonic transmitting unit 50 may continuously vary in position. For example, when the handle 22 is moved forward and backward, the position of the ultrasonic transmitting unit 50 may also vary forward and backward.

Also, when the distance between the ultrasonic transmitting unit 50 and the cleaner body 10 is above the first reference distance, the movement of the cleaner body 10 is necessary.

In the result determined in the operation S4, when the movement of the cleaner body 10 is necessary, the controller 70 may drive at least one motor of the first motor 15 and the second motor (S5).

As illustrated in FIG. 4, to reduce the distance between the ultrasonic transmitting unit 50 and the cleaner body 10, the controller 70 may drive the first and second motors 15 and 16 at the same rotation rate. In this case, the cleaner body 10 may be moved forward toward the ultrasonic transmitting unit 50.

As illustrated in FIG. 5, when the user is moved to a left side while being moved forward, the controller 70 may drive the first and second motors 15 and 16. Here, the controller 70 may control the first and second motors 15 and 16 so that the first motor 15 is driven at a rotation rate greater than that of the second motor 16.

Thus, since the first wheel 11 is rotated at a rotation rate greater than that of the second wheel 12, the cleaner body 10 may be rotated to the left side while being moved forward toward the ultrasonic transmitting unit 50.

As illustrated in FIG. 6, when the user is moved to a right side while being moved forward, the controller 70 may drive the first and second motors 15 and 16. Here, the controller 70 may control the first and second motors 15 and 16 so that the second motor 16 is driven at a rotation rate greater than that of the first motor 15.

Thus, since the second wheel 12 is rotated at a rotation rate greater than that of the first wheel 11, the cleaner body 10 may be rotated to the right side while being moved forward toward the ultrasonic transmitting unit 50.

FIGS. 4 and 5 illustrate cases in which an obstacle does not exist in a moving path of the cleaner body 10 when the first and second motors 15 and 16 are driven.

However, as illustrated in FIG. 7A, when an obstacle O exists in the moving path of the cleaner body 10, the movement of the cleaner body 10 may be interrupted by the obstacle O. As a result, the cleaner body 10 may be maintained in the stopped state or moved at a rotation rate less than its original rotation rate.

Thus, to move the cleaner body 10 toward the handle 22, it may be necessary to avoid the obstacle O.

The controller 70 may detect the obstacle while at least one motor of the first and second motors 15 and 16 is driven to determine whether an operation for avoiding the obstacle is necessary (S4).

Particularly, the controller 70 may determine whether the operation for avoiding the obstacle O is necessary on the basis of the current detected by at least one current detector of the current detectors 17 and 18.

For example, when the current detected by the at least one current detector of the current detectors 17 and 18 is above limited current, the controller 70 may determine that the operation for avoiding the obstacle is necessary.

The controller 70 may determine a target rotation rate of each of the motors 15 and 16 and target input current so that each of the motors 15 and 16 is driven at the determined target rotation rate to apply the determined target input current to each of the motors 15 and 16.

Here, the controller 70 may recognize an actual rotation rate of each of the motors 15 and 16 (or the wheels) through an encoder. Also, when the actual rotation rate is less than the target rotation rate, the target input current may be increased to increase the actual rotation rate.

Also, when the rotation rate is maximized, the target input current may be set to a value that is less than the limited current.

When the obstacle O does not exist in the moving path of the cleaner body 10, the target input current may be uniformly maintained and slightly changed. In general, since a friction coefficient between the bottom surface along which the cleaner body is moved and the wheels 11 and 12 contacting the bottom surface is greater than 0, the target input current may vary according to the state of the bottom surface or the wheels 11 and 12.

However, in this case, the variation of the target input current is not large.

Thus, in this case, since the target input current is less than the limited current, the controller 70 may determine that the obstacle O does not exist.

On the other hand, when the obstacle O exists in the moving path of the cleaner body 10, even though current is applied to the at least one motor of the motors 15 and 16, since the at least one motor of the motors 15 and 16 is abnormally rotated, the rotation rate of each of the motors 15 and 16 (or the wheels) may be less than the target rotation rate. In this case, the controller 70 may increase the target input current to increase the rotation rate of each of the motors 15 and 16.

Since the cleaner body 10 is not normally moved by the obstacle O even though the controller 70 increases the target input current, the controller 70 may increase the target input current in stages. Thus, while the target input current is increased, the current detected by the at least one current detector of the current detectors 17 and 18 may be greater than the limited current.

Thus, the controller 70 may determine that the operation for avoiding the obstacle is necessary when the current detected by the at least one current detector of the current detectors 17 and 18 is greater than the limited current.

Also, when a time taken to allow the current detected by the at least one current detector of the current detectors 17 and 18 to be greater than the limited current reaches a predetermined time, the controller 70 may determine that the operation for avoiding the obstacle is necessary.

For another example, the controller 70 may determine whether the operation for avoiding the obstacle is necessary on the basis of the current detected by the at least one current detector of the current detectors 17 and 18 and the intensity f the ultrasonic waves received into the ultrasonic receiving unit 60.

In the current embodiment, the intensity of the ultrasonic waves may be an output value of the ultrasonic waves outputted from one of the plurality of receiving parts 61, 62, and 63 or the sum or mean value of output values outputted from the plurality of receiving parts 61, 62, and 63.

Particularly, when at least one motor of the first and second motors 15 and 16 is driven to normally move the cleaner body 10, the current detected by the at least one current detector of the current detectors 17 and 18 may be substantially uniform.

Also, since the distance between the cleaner body 10 and the ultrasonic transmitting unit 50 is reduced, the intensity of the ultrasonic waves received into the ultrasonic receiving unit 60 may be increased.

Thus, a ratio of the current detected by the at least one current detector of the current detectors 17 and 18 to the intensity of the ultrasonic waves may be increased. That is, the ratio of the current to the intensity of the ultrasonic waves may be greater than a reference ratio.

On the other hand, although at least one motor of the first and second motors 15 and 16 is driven, if the cleaner body 10 is not normally moved by the obstacle O, the current detected by the at least one current detector of the current detectors 17 and 18 may be increased.

Also, since the distance between the cleaner body 10 and the ultrasonic transmitting unit 50 is uniform or uniformly increased, the intensity of the ultrasonic waves received into the ultrasonic receiving unit 60 may be uniform or uniformly decreased. Thus, a ratio of the current detected by the at least one current detector of the current detectors 17 and 18 to the intensity of the ultrasonic waves may be decreased. That is, the ratio of the current to the intensity of the ultrasonic waves may be less than the reference ratio.

Thus, the controller 70 may determine that the operation for avoiding the obstacle O is necessary when the ratio of the current to the intensity of the ultrasonic waves is less than the reference ratio.

In the result determined in the operation S6, if it is determined that the operation for avoiding the obstacle O is unnecessary, the controller 70 may determined whether the stop of the cleaner body 10 is necessary (S7).

That is, the controller 70 may determine a time point at which the cleaner body 10 is stopped while the cleaner body 10 is moved by the driving of the at least one motor of the motors 15 and 16.

When the stopping of the cleaner body 10 is necessary, the distance between the ultrasonic transmitting unit 50 and the cleaner body 10 may be less than a second reference distance that is less than the first reference distance.

In the result determined in the operation S7, when the stopping of the cleaner body 10 is necessary, the controller 70 may stop the operating motors 15 and 16. As a result, the movement of the cleaner body 10 may stand by in the stopped state.

As described above, the reason in which the cleaner body 10 is stopped while being moved is for preventing the cleaner body 10 from colliding with the user.

In the result determined in the operation S6, if it is determined that the operation for avoiding the obstacle O is necessary, the controller 70 may control each of the motors 15 and 16 so that the cleaner body 10 performs the operation for avoiding the obstacle O (S9).

For example, to avoid the obstacle O as illustrated in FIG. 7B, the cleaner body 10 may be moved backward by a predetermined distance from the present position (that is a position at which the obstacle O is detected). That is, the controller 70 may control each of the motors 15 and 16 so that the motors 15 and 16, which are rotated in a first direction, are rotated in a second direction opposite to the first direction. Thus, the cleaner body 10 may be spaced a predetermined distance from the obstacle O.

Then, as illustrated in FIG. 8A, in the state in which the cleaner body 10 is spaced a predetermined distance from the obstacle O, the controller 70 may control the cleaner body 10 so that the cleaner body 10 is rotated to the left side, or, as illustrated in FIG. 8B, the cleaner body 10 is rotated to the right side.

To rotate the cleaner body 10 to the left side, the controller 70 may drive each of the first and second motors 15 and 16. Here, the controller 70 may control each of the first and second motors 15 and 16 so that the first motor 15 is driven at a rotation rate greater than that of the second motor 16.

On the other hand, to rotate the cleaner body 10 to the right side, the controller 70 may drive each of the first and second motors 15 and 16. Here, the controller 70 may control each of the first and second motors 15 and 16 so that the second motor 16 is driven at a rotation rate greater than that of the first motor 15.

The controller 70 may control each of the motors 15 and 16 so that the cleaner body 10 is stopped after being rotated to the left or right side. Also, the controller 70 rotates each of the motors 15 and 16 at the same rotation rate so that the cleaner body 10 is moved forward by a predetermined distance after being rotated to the left and right side.

For another example, in the state of FIG. 7A, the cleaner body 10 may be rotated to the left or right side while being moved backward so as to be spaced apart from the obstacle. That is, each of the first and second motors 15 and 16 may be rotated in the second direction. Here, the first and second motors 15 and 16 may be rotated at rotation rates different from each other.

The controller 70 may determine a position of the ultrasonic transmitting unit again after the operation for avoiding the obstacle O is performed and then determine again whether the movement of the cleaner body 10 is necessary.

According to the proposed embodiment, since the cleaner body is moved by following the movement of the user, the user may not directly move the cleaner body to improve the user's convenience.

Also, since whether the obstacle exists on the moving path of the cleaner body is determined to avoid the obstacle, the cleaner body may be accurately moved in the moving direction of the user.

In this specification, the ultrasonic transmitting unit and the ultrasonic receiving unit may be components for detecting the movement of the suction device and thus be called a detection device.

In the foregoing embodiment, although the current detector and the detection device are used as a unit for determining whether the obstacle is avoided, an obstacle detector may be provided on the cleaner body.

For example, the obstacle detector may include a switch disposed on a front portion of the cleaner body. When the cleaner body collides with the obstacle, the switch may be turned on.

For another example, the obstacle detector may include at least one optical sensor such as an infrared sensor or ultrasonic sensor.

All components may be coupled to one another to form a single body or to operate as a single body, but the present disclosure is not limited thereto. That is, one or more components are selectively coupled and operated within the scope of the present disclosure. The terms "comprising," "including," and "having," as used in the claims and specification herein, shall be considered as indicating an open group that may include other elements not specified. Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

The above-disclosed subject matter is to be considered illustrative, and not restrictive, and the appended claims are intended to cover all such modifications, enhancements, and other embodiments, which fall within the true spirit and scope of the present disclosure. Thus, the embodiment of the present invention is to be considered illustrative, and not restrictive, and the technical spirit of the present invention is not limited to the foregoing embodiment. Therefore, the scope of the invention is defined not by the detailed description of the invention but by the appended claims, and all differences within the scope will be construed as being included in the present disclosure.

The invention claimed is:

1. A vacuum cleaner comprising:
 a cleaner body including a moving device for moving, the moving device comprising a plurality of wheels and a plurality of motors for rotating the plurality of wheels;
 a suction device connected to the cleaner body to suction dusts and air and guide the suctioned dusts and air to the cleaner body, the suction device comprising a handle;

a detection device configured to detect a distance between the handle and the cleaner body; and a controller configured to determine whether movement of the cleaner body is necessary on the basis of the distance between the cleaner body and the handle, the controller controlling the moving device when the movement of the cleaner body is necessary, wherein, when the movement of the cleaner body is necessary, the distance between the handle and the cleaner body is above a first reference distance, wherein the controller controls the moving device to allow the cleaner body to avoid an obstacle when it is determined that an operation for avoiding the obstacle is necessary while the moving device operates, wherein the vacuum cleaner further comprises a plurality of current detectors configured to detect current inputted into each of the plurality of motors, wherein the controller is configured to determine whether the operation for avoiding the obstacle is necessary on the basis of the current detected by at least one current detector of the plurality of current detectors while the moving device operates, wherein the controller is configured to drive the moving device to allow the cleaner body to be moved backward so that the cleaner body avoids the obstacles, or to drive the moving device to allow the cleaner body to be rotated to a left or right side while the cleaner body is moved backward so that cleaner body avoids the obstacle when the operation for avoiding the obstacle is necessary, wherein the controller is configured to determine whether stopping of the cleaner body is necessary when the operation for avoiding the obstacle is unnecessary, wherein, when the stopping of the cleaner body is necessary, the distance between the handle and the cleaner body is less than a second reference distance that is less than the first reference distance, and wherein the controller is configured to drive the moving device to allow the cleaner body to be stopped when the distance between the handle and the cleaner body is less than the second reference distance.

2. The vacuum cleaner according to claim 1, wherein the controller determines that the operation for avoiding the obstacle is necessary when the current detected by the at least one current detector of the plurality of current detectors is above a threshold current while the current is applied to the at least one motor of the plurality of motors.

3. The vacuum cleaner according to claim 1, wherein the detection device comprises:

an ultrasonic transmitting unit disposed on the suction device to transmit ultrasonic waves; and an ultrasonic receiving unit disposed on the cleaner body to receive the ultrasonic waves transmitted from the ultrasonic transmitting unit.

4. The vacuum cleaner according to claim 3, wherein controller determines whether the operation for avoiding the obstacle is necessary on the basis of an intensity of the ultrasonic waves received into the ultrasonic receiving unit and the current detected by the at least one current detector of the plurality of current detectors.

5. The vacuum cleaner according to claim 4, wherein the controller determines that the operation for avoiding the obstacle is necessary when a ratio of the current detected by the at least one current detector to the intensity of the ultrasonic waves is less than a reference ratio.

6. The vacuum cleaner according to claim 1, further comprising an obstacle detector disposed on the cleaner body to detect the obstacle, wherein, when the obstacle is detected by the obstacle detector while the cleaner body is moved, the controller determines that the operation for avoiding the obstacle is necessary.

7. The vacuum cleaner according to claim 1, wherein the controller controls the moving device so that the cleaner body is rotated to a left or right side in a state in which the cleaner body is moved backward by a predetermined distance from the obstacle.

8. The vacuum cleaner according to claim 1, wherein, after the cleaner body avoids the obstacle, the controller determines again whether the movement of the cleaner body is necessary on the basis of information detected by the detection device.

9. A method for controlling a vacuum cleaner, the method comprising:

detecting movement of a suction device by a detection device;

determining whether movement of a cleaner body connected to the suction device is necessary by a controller on the basis of a distance between the suction device and the cleaner body;

driving a moving device disposed on the cleaner body by the controller when the movement of the cleaner body is necessary, wherein, when the movement of the cleaner body is necessary, the distance between a handle and the cleaner body is above a first reference distance;

determining whether an operation for avoiding an obstacle is necessary by the controller while the moving device is driven; and controlling the moving device by the controller to allow the cleaner body to avoid the obstacle when the operation of the cleaner body for avoiding the obstacle is necessary, wherein the vacuum cleaner further comprises a plurality of current detectors configured to detect current inputted into each of a plurality of motors for driving a plurality of wheels, wherein the controller is configured to determine whether the operation for avoiding the obstacle is necessary on a basis of the current detected by at least one current detector of the plurality of current detectors while the moving device operates, wherein the controller is configured to drive the moving device to allow the cleaner body to be moved backward so that the cleaner body avoids the obstacles, or to drive the moving device to allow the cleaner body to be rotated to a left or right side while the cleaner body is moved backward so that cleaner body avoids the obstacle, when the operation for avoiding the obstacle is necessary, wherein the controller is configured to determine whether stopping of the cleaner body is necessary when the operation for avoiding the obstacle is unnecessary, wherein, when the stopping of the cleaner body is necessary, the distance between the handle and the cleaner body is less than a second reference distance that is less than the first reference distance, and wherein the controller is configured to drive the moving device to allow the cleaner body to be stopped when the distance between the handle and the cleaner body is less than the second reference distance.

10. The method according to claim 9, wherein the controlling of the moving device to avoid the obstacle comprises driving the plurality of motors at the same rotation rate so that the cleaner body is moved backward.

11. The method according to claim 9, wherein the controlling of the moving device to avoid the obstacle comprises driving the plurality of motors at rotation rates different from each other so that the cleaner body is rotated to a left or right side while being moved backward.

12. The method according to claim 9, wherein, in the determining of whether the operation of the cleaner body for avoiding the obstacle is necessary, it is determined that the operation for avoiding the obstacle is necessary when the current detected by the at least one current detector of the plurality of current detectors is above a threshold current.

* * * * *